US012724868B2

(12) United States Patent
Cheng et al.

(10) Patent No.: US 12,724,868 B2
(45) Date of Patent: Sep. 1, 2026

(54) METHOD AND SYSTEM FOR STARTING UP OR MANAGING AN OFFLINE CONTROL DEVICE

(71) Applicant: Sphinx Electronics GmbH & Co KG, Kenzingen (DE)

(72) Inventors: Trong-Nghia Cheng, Freiburg (DE); Reinhard Eggert, Schallstadt (DE); Pascal Bodechon, Ettenheim (DE)

(73) Assignee: Sphinx Electronics GmbH & Co KG, Kenzingen (DE)

( * ) Notice: Subject to any disclaimer, the term of this patent is extended or adjusted under 35 U.S.C. 154(b) by 521 days.

(21) Appl. No.: 18/069,395

(22) Filed: Dec. 21, 2022

(65) Prior Publication Data

US 2023/0117696 A1 Apr. 20, 2023

Related U.S. Application Data

(63) Continuation of application No. PCT/EP2021/067632, filed on Jun. 28, 2021.

(30) Foreign Application Priority Data

Jul. 1, 2020 (DE) ..................... 10 2020 117 287.7

(51) Int. Cl.
*G06F 21/44* (2013.01)
*G06F 21/45* (2013.01)
(Continued)

(52) U.S. Cl.
CPC .............. *G06F 21/44* (2013.01); *G06F 21/45* (2013.01); *G06F 21/64* (2013.01); *H04L 9/3234* (2013.01); *H04L 9/3236* (2013.01); *H04L 9/3247* (2013.01)

(58) Field of Classification Search
CPC ....... G06F 21/44; G06F 21/45; H04L 9/3236; H04L 9/3247; H04L 2463/082; H04L 63/08
See application file for complete search history.

(56) References Cited

U.S. PATENT DOCUMENTS 7,272,385 B2 9/2007 Mirouze et al.
10,080,133 B2 9/2018 Ibasco et al.
(Continued)

FOREIGN PATENT DOCUMENTS

CA 2 412 810 A1 1/2002
CN 105915343 A * 8/2016
(Continued)

*Primary Examiner* — Rupal Dharia
(74) *Attorney, Agent, or Firm* — Orbit IP, LLP; Marc G. Martino

(57) ABSTRACT

A method of starting up and managing an offline control device with a management control unit and a terminal, includes: implementing of a multi-factor/ID authentication algorithm in the terminal; delivering the terminal and a first storage medium having a storage medium ID and a first security code to a customer; delivering of a second security code generated using the first security code, to a second storage medium of the customer; positioning, by a user, of the first and second storage mediums at the terminal and reading of the storage medium ID and the first and second security codes, and offline checking by the algorithm of the terminal, whether the read first and second security codes are valid with one another; after a positive multi-factor authentication check, storing the storage medium ID as the authorization ID and the first security code in the terminal; and terminating the initial start-up mode.

21 Claims, 1 Drawing Sheet

(51) Int. Cl.
*G06F 21/64* (2013.01)
*H04L 9/32* (2006.01)

(56) References Cited

U.S. PATENT DOCUMENTS

2004/0124966 A1* 7/2004 Forrest .................... G07F 7/125 340/5.41
2009/0181644 A1* 7/2009 Humphrey ......... G06Q 20/3278 705/41
2015/0031351 A1* 1/2015 Ibasco ............... H04M 3/42042 455/419
2015/0154388 A1* 6/2015 Sakamoto ............. H04L 63/168 726/19
2015/0381368 A1* 12/2015 Stevens, Jr. ........... H04L 63/126 705/40
2016/0140334 A1* 5/2016 Forehand ................ G06F 21/44 726/19
2016/0191520 A1* 6/2016 Voice .................. H04L 63/0869 726/7
2017/0048106 A1* 2/2017 Berry .................. H04L 41/0886
2017/0195118 A1* 7/2017 Perretta ................. H04L 9/0643
2018/0041341 A1* 2/2018 Gulati ................... H04L 9/0894
2019/0007396 A1* 1/2019 Krummel ............ H04L 63/0869
2019/0156017 A1* 5/2019 Feng ....................... G06F 21/44
2020/0053096 A1* 2/2020 Bendersky .............. G06F 21/32
2020/0104478 A1* 4/2020 Chauhan ................. G06F 16/27
2020/0162455 A1* 5/2020 Lin ..................... H04L 63/0853
2020/0280855 A1* 9/2020 Avetisov ................. H04L 63/20

FOREIGN PATENT DOCUMENTS

CN 109271757 A * 1/2019 ............. G06F 21/12
CN 105 915 343 B 7/2019
CN 110737884 A * 1/2020
EP 1564691 B1 * 6/2013 ............. B60R 25/24
EP 1 710 760 B1 11/2013
EP 3 035 172 A1 6/2016
JP 2013-206286 A 10/2013
RU 2 596 588 C2 9/2016
RU 2 628 484 C2 8/2017

* cited by examiner

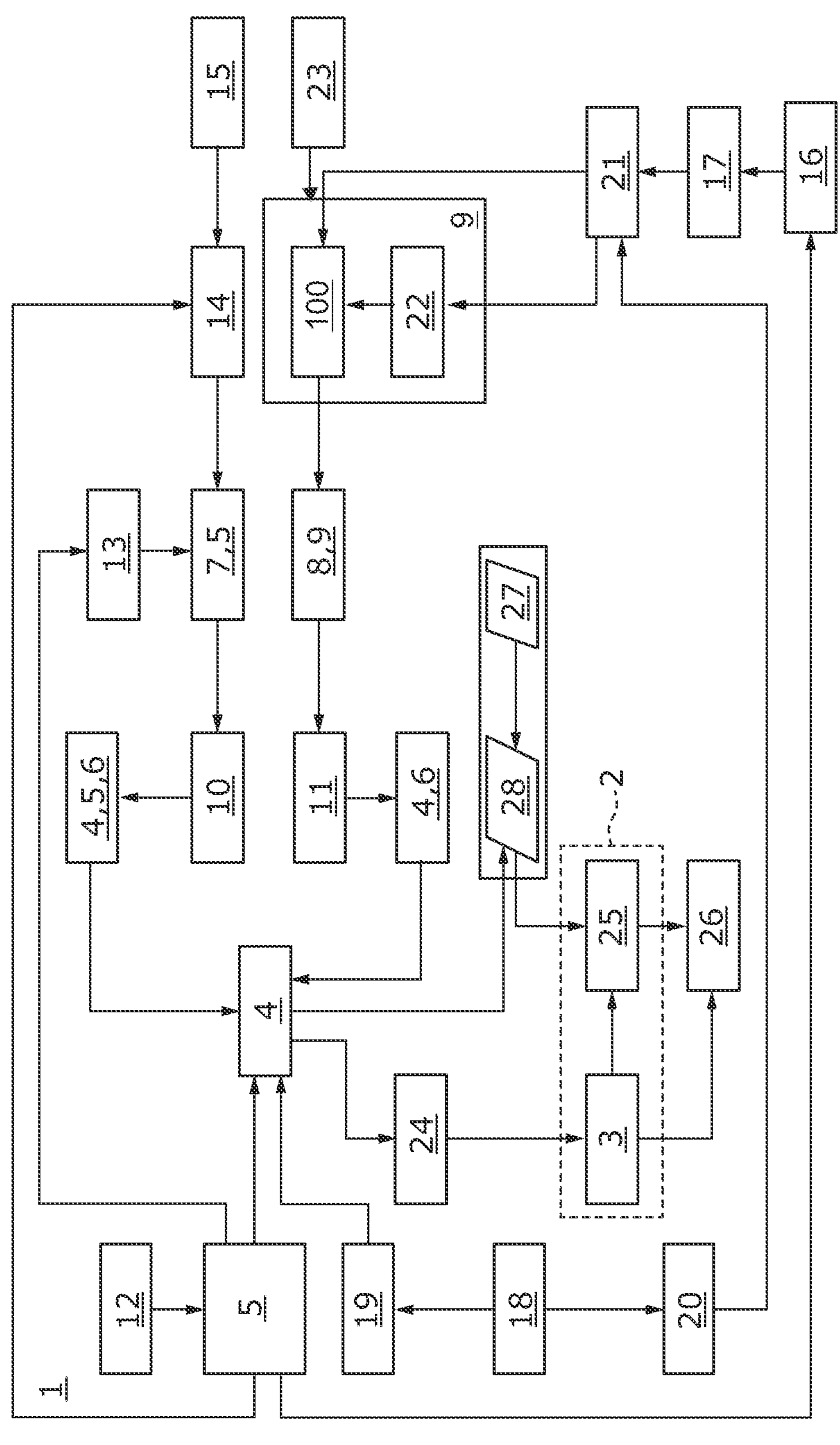
1
2
3
4
5
7,5
8,9
9
10
11
12
13
14
15
16
17
18
19
20
21
22
23
24
25
26
27
28
100
4,5,6
4,6

METHOD AND SYSTEM FOR STARTING UP OR MANAGING AN OFFLINE CONTROL DEVICE

CROSS-REFERENCE TO RELATED APPLICATIONS

This continuation application claims priority to PCT/EP2021/067632 filed on Jun. 28, 2021 which has published as WO 2022/002823 A1 and also the German application number 10 2020 117 287.7 filed on Jul. 1, 2020, the entire contents of which are fully incorporated herein with these references.

DESCRIPTION

Field of the Invention

The invention relates to a method and a system for starting up and managing an offline control device, in particular an offline access control device, by means of a multi-factor/ID authentication.

Background of the Invention

Terminals produced by manufacturers are normally delivered in an unprotected condition and are accessible to third parties (customers). "Authorizations" are assigned to the terminal only by means of a multi-factor authentication in order to enable a protected/secured (initial) start-up. The terminal is protected against unauthorized "access" from this time.

SUMMARY OF THE INVENTION

The object of the invention is to ensure, in the case of an offline control device, i.e., a device which is not connected to the Internet, that only a duly entitled person or entitled device is authorized.

This object is achieved according to the invention by a method for starting up and managing an offline control device, in particular an offline access control device, by means of a multi-factor/ID authentication, wherein the control device comprises a management control unit (e.g., connect modular core) and a terminal which activates the management control unit, with the following method steps for the initial start-up of the control device:

- implementing, in particular by the terminal manufacturer, of a multi-factor/ID authentication algorithm in the terminal;
- delivering, in particular by the provider of the control device, of the terminal, in a factory state, and an, in particular mobile, first storage medium (e.g., AKC transponder), in which a storage medium ID (e.g., transponder UID (Unique Identifier)) and a first security code (1st factor, e.g., secure token) are stored in a forgery-proof and globally unique manner, to a customer;
- delivering, in particular by the provider of the control device, of a second security code (2nd factor, e.g., secure signature which is stored (packed) in a license file), generated, in particular by the terminal manufacturer, using the first security code, to a second storage medium, in particular to a mobile terminal (e.g., smartphone) of the customer;
- positioning, by a user, of the first and the second storage medium (e.g., AKC transponder and smartphone) at the location of the terminal and reading, by the terminal, of the storage medium ID and the first and the second security code, and offline checking, by means of the multi-factor authentication algorithm of the terminal, whether the read first and second security codes are valid with one another;
- after a positive multi-factor authentication check, storing the storage medium ID as the authorization ID and the first security code in the terminal, and, if necessary, subsequently activating the management control unit by means of the terminal for the management of the management control unit by the user; and
- terminating the initial start-up mode;
- and, on completion of the initial start-up of the control device, with the following method steps for managing the management control unit:
- positioning, by a user, of two storage media (e.g., AKC transponder and smartphone) at the location of the terminal, and reading, by the terminal, of a storage medium ID and a security code of the one storage medium (e.g., AKC transponder) and a security code of the other storage medium (e.g., smartphone), and offline checking, by means of the multi-factor/ID authentication algorithm of the terminal, whether the read storage medium ID and the read security code of the one storage medium match the authorization ID stored in the terminal and the first security code stored in the terminal, and the two read security codes are valid with one another;
- after a positive multi-factor/ID authentication check, activating, by the terminal, of the management control unit for the management of the management control unit by the user; and
- terminating the management mode.

The multi-factor authentication check is preferably carried out in the management mode only after a positive ID authentication check.

The method according to the invention secures communication with the control unit (e.g., connect modular core) by performing a multi-factor authentication (MFA) before the start of every communication. To do this, before the actual customer communication (initial start-up or management mode) with the control unit, a check is carried out using at least two different authorization features by means of security codes and storage media. Both the validity and the number of the first storage media (e.g., AKC (Authorization Key Card) transponders) can be set as required by the terminal manufacturer. The strength of the method lies in the fact that the checking of all components can be performed "offline", i.e., by way of a direct connection with no detour via the Internet or other network. The terminal alone validates the security codes which are generated exclusively by the terminal manufacturer. The purchaser of the terminals, i.e., the customer, has no knowledge of the security codes and cannot therefore pass them on to unauthorized parties. This guarantees a high level of security.

The first security code (e.g., secure token) is preferably stored on a transponder (e.g., RFID transponder) also supplied to the customer, for example in the form of a binary code of at least 16 bytes. A 16-byte binary code gives $2^{16*8}$ possibilities for generating a 16-byte binary code, so that a binary code of this type offers a high level of security.

The transmission to the terminal of a storage medium ID and/or a security code of a storage medium (e.g., AKC transponder, smartphone) positioned at the location of the terminal is preferably performed in a wireless or wired manner, in particular by means of RFID or BLUETOOTH®, and in fact offline, i.e., by way of a direct connection with no detour via the Internet or other network.

The second security code (e.g., secure signature) is preferably supplied as a digital signature of the first security code to a mobile terminal of the customer, in particular to a smartphone. To do this, the second security code can advantageously be encrypted by means of a private key of the terminal manufacturer and the validity of the encrypted second security code can be verified by the authentication algorithm of the terminal by means of a public key of the terminal manufacturer. A digital signature algorithm (DSA) or elliptic curve digital signature algorithm (ECDSA), for example, can be used for the encryption, and an algorithm defined in the Federal Information Processing Standard (FIPS) or Digital Signature Standard (DSS) can be used to generate the digital signature. The private and public keys are generated using the DSA or ECDSA.

In order to generate the second security code, for example, a hash value of the first security code can be defined by means of a cryptographic hash function which is applied to the first security code, and the private key of the terminal manufacturer is then applied to this hash value of the first security code in order to generate the second security code in the form of a digital signature of the first security code, such as e.g., in the form of a digital license file. Hash functions or scatter value functions serve to map input values in the form of character strings of any length onto fixed-length character strings, the hash values, in particular natural numbers. Cryptographic hash functions are, in particular, more or less collision-free, i.e., in particular, different input values are mapped onto different equal hash values with only an extremely low probability. In particular, a hash function from the secure hash algorithm-2 (SHA-2) family or SHA-3 family is used.

The second security code (e.g., secure signature) can be transmitted wirelessly, in particular by means of BLUETOOTH®, from the second storage medium (e.g., smartphone) to the terminal, and in fact offline, i.e., by way of a direct connection with no detour via the Internet or other network.

The invention also relates to a system suitable for carrying out the method according to the invention for starting up and managing an offline control device, in particular an offline access control device, by means of a multi-factor/ID authentication, comprising:

- a control device which comprises a management control unit (e.g., connect modular core) and a terminal activating the management control unit having at least one data interface, wherein a multi-factor/ID authentication algorithm is implemented and at least one authorization ID and one security code are storable in the terminal;
- a mobile first storage medium (e.g., AKC transponder) in which a storage medium ID (e.g., transponder UID (Unique Identifier)) and a first security code (1st factor, e.g., secure token) are stored in a forgery-proof manner;
- a mobile second storage medium, in particular a mobile terminal (e.g., smartphone) in which a second security code (2nd factor, e.g., secure signature, which is stored (packed) in a license file) generated by means of a first security code, is stored,
- wherein the multi-factor/ID authentication algorithm for the initial start-up of the control device is programmed, in the case of two storage media (e.g., AKC transponder and smartphone) positioned by a user at the location of the terminal, to read a storage medium ID and a security code of the one storage medium and a security code of the other storage medium by means of the at least one data interface, and to check offline whether the read first and second security codes are valid with one another and, if so, to store the storage medium ID as the authorization ID and the first security code in the terminal and to terminate the initial start-up mode, and
- wherein the multi-factor/ID authentication algorithm for the management of the management control unit is programmed, in the case of two storage media (AKC transponder and smartphone) positioned by a user at the location of the terminal, to read a storage medium ID and a security code of the one storage medium and a security code of the other storage medium by means of the at least one data interface and to check offline whether the read storage medium ID and the read security code of the one storage medium match the authorization ID stored in the terminal and the first security code stored in the terminal and the two read security codes are valid with one another, and, if so, to activate the management control unit for management by the user, and to terminate the management mode.

The multi-factor/ID authentication algorithm is preferably programmed to perform the multi-factor authentication check in the management mode only after a positive ID authentication check and/or, in the initial start-up mode, after the storage of the authorization ID, to activate the management control unit for the management of the management control unit by the user.

By means of two different security codes which are not known to the user of the offline control device, on two different storage media, and by means of their separate verification by the multi-factor/ID authentication algorithm, the system offers a high level of security, even if one of the two security codes is known to third parties.

The first storage medium can preferably be a transponder, in particular an RFID transponder, and the terminal can have a data interface, in particular an RFID interface, for the wireless reading of data stored in the transponder, such as e.g., of the first security code. RFID transponders enable a direct data interchange at short range, which is independent from other communication channels such as the Internet. RFID transponders are also characterized by a compact design. In particular, "ISO/IEC 14443 A 1-4" RFID transponders are used.

The second storage medium can preferably be a mobile device of the customer, in particular a smartphone, and the terminal can include a data interface, in particular a BLUETOOTH® interface, for the wireless reading of data stored in the mobile terminal, such as e.g., of the second security code. The BLUETOOTH® interface enables a direct data interchange at short range, which is independent from other communication channels such as the Internet.

The first storage medium (AKC) preferably includes a copy/clone, write protection, read protection and manipulation protection and/or the second storage medium (smartphone) includes manipulation protection. The data on the storage media cannot therefore be modified or copied by unauthorized persons.

An AKC (Authorization Key Card) app of the provider activated by means of the second security code (e.g., secure signature) is particularly preferably installed on a mobile terminal (e.g., smartphone) for managing the management control unit.

Further advantages of the invention can be found in the description, the claims, and the drawing. The features mentioned above and further described below can similarly be used separately or as a plurality in any given combinations.

The embodiments indicated and described are not to be understood as a definitive listing, but rather as examples to illustrate the invention.

BRIEF DESCRIPTION OF THE DRAWINGS

In the drawing:

FIG. 1 shows a schematic view of the system according to the invention for starting up or managing an offline control device.

DETAILED DESCRIPTION OF THE PREFERRED EMBODIMENTS

The system 1 shown in FIG. 1 serves to start up and manage an offline control device 2, such as e.g., an offline access control device, by means of a multi-factor/ID authentication.

The system comprises:

- a start-up/management control unit 3;
- a terminal 4 which activates the control unit 3 and in which a first security code (1st factor, e.g., secure token) 5 known exclusively to the terminal manufacturer is storable, and a multi-factor/ID authentication algorithm 6 is implemented;
- a mobile first storage medium 7, below, merely by way of example, in the form of a transponder, such as e.g., an RFID transponder, in which a storage medium ID (UID) of the first storage medium 7 and the first security code 5 are stored in a forgery-proof and globally unique manner; and
- a mobile second storage medium 8, below, merely by way of example, in the form of a mobile terminal (e.g., smartphone), in which a second security code (2nd factor, e.g., secure signature) 22 generated by the terminal manufacturer using the first security code 5 is stored.

The terminal 4 has both a data interface (e.g., RFID reading device) 10 for the wireless reading of the data (storage medium ID and first security code 5) stored in the transponder 7 and a data interface (e.g., BLUETOOTH® interface) 11 for the wireless reading of the second security code 22 stored in the mobile terminal 8.

A random number generator 12 of the system 1 creates a random first security code 5 which is stored in a transponder production unit 13 in the transponder 7. The transponder 7 has a read/write protection 14 which is protected with a forgery-proof copy/clone and manipulation protection 15 known only to the terminal manufacturer. This copy/clone and manipulation protection 15 can, for example, be an individual coding dependent on the transponder ID (UID).

A hash value 17 of the first security code 5 is defined by means of a cryptographic hash function or a hash value algorithm 16. A public key 19 and a private key 20 of the terminal manufacturer are generated in a generator (e.g., ECDSA generator) 18 for asymmetric cryptography. The public key 19 is stored in the terminal 4. A dataset, referred to below as the digital secure signature 22, which forms the second security code 22—e.g., in the form of a license file 9, including license options 100—is created in a calculation unit 21 from the hash value 17 by means of the private key 20. The second security code 22 is protected with a manipulation protection 23 known only to the terminal manufacturer.

The initial start-up of the offline control device 2 by means of the multi-factor/ID authentication is described below, merely in representational form using the example of a transponder 7 as the first storage medium and a mobile terminal 8 as the second storage medium, and has the following method steps:

- implementing, in particular by the terminal manufacturer, of the multi-factor/ID authentication algorithm 6 in the terminal 4;
- delivering, in particular by the provider of the control device 2, of the terminal 4, in a factory state, and the transponder 7, in which the transponder UID and the first security code 5 (1st factor, e.g., secure token) are stored in a forgery-proof and globally unique manner, to a customer;
- delivering, in particular by the provider of the control device 2, of the second security code 22 (2nd factor, e.g., secure signature) generated, in particular by the terminal manufacturer, using the first security code 5, to the mobile terminal 8 (e.g., smartphone) of the customer;
- positioning, by a user, of the transponder 7 and the mobile terminal 8 at the location of the terminal 4, and reading, by the terminal 4, of the transponder ID and the first and the second security code 5, 22, and offline checking by means of the multi-factor authentication algorithm 6 of the terminal 4 whether the read first and second security codes 5, 22 are valid with one another;
- after a positive multi-factor authentication check, storing the transponder UID as the authorization ID and the first security code 5 in the terminal 4, and, if necessary, subsequently activating the management control unit 3 by means of an activation circuit 24 of the terminal 4 for the management of the management control unit 3 by the user; and
- terminating the initial start-up mode.

On completion of the initial start-up of the control device 2, the following method steps are carried out for managing the management control unit 3:

- positioning, by a user, of two storage media (e.g., transponder 7 and mobile terminal 8) at the location of the terminal 4, and reading, by the terminal 4, of the transponder UID and a security code of the transponder 7 and a security code of the mobile terminal 8, and offline checking by means of the multi-factor/ID authentication algorithm 6 of the terminal 4 whether the read transponder UID and the read security code of the transponder 7 match the authorization ID stored in the terminal 4 and the first security code 5 stored in the terminal 4, and the two read security codes are valid with one another;
- after a positive multi-factor/ID authentication check, activating, by the terminal 4, of the management control unit 3 for the management of the management control unit 3 by the user; and
- terminating the management mode.

The control device 2 manages the authorization 25, e.g., of a locking mechanism 26, and can open and close the locking mechanism 26. In order to actuate the locking mechanism 26, a user enters an access code (e.g., PIN code) 27 communicated to him into a reading device (e.g., PIN code reading device) 28. The access authorization 25 verifies the authorization of the entered access code 27 and actuates the locking mechanism 26 only if the authorization check was successful.

What is claimed is:

1. A method for starting up and managing an offline access control device, by a multi-factor and ID authentication, wherein the offline access control device comprises a management control unit and a terminal which activates the management control unit, the method has having the following method steps for initial start-up of the offline access control device in an initial start-up mode and then having the following method steps for a management mode comprising:

implementing the multi-factor and ID authentication algorithm in the terminal;

generating, exclusively by a terminal manufacturer, a first security code and a second security code;

delivering the terminal, in a factory state as a new system delivered from the terminal manufacturer to a customer;

delivering a first storage medium, in which a storage medium ID and the first security code are stored in the first storage medium in a forgery-proof copy/clone and manipulation protection known only to the terminal manufacturer, to the customer;

delivering the second security code generated using the first security code, to a second storage medium of the customer;

positioning, by the customer, the first and the second storage medium at the location of the terminal, and reading, by the terminal, of the storage medium ID and the first and the second security code, and offline checking whether the read first and second security code match one another;

after the terminal has matched the first and the second security codes, storing the storage medium ID as an authorization ID and the first security code in the terminal, and subsequently activating the management control unit by means of the terminal for the management of the management control unit by the customer; and terminating the initial start-up mode; and wherein on completion of the initial start-up of the offline access control device, the following method steps for managing the management control unit in the management mode comprises:

positioning, by the customer, the first storage medium and the second storage media at the location of the terminal and reading, by the terminal, of the storage medium ID and the first security code of the first storage medium and the second security code of the second storage medium, and offline checking whether the read storage medium ID and the read first security code of the first storage medium match the authorization ID stored in the terminal and the first security code stored in the terminal, and offline checking whether the read first security codes matches the read second security code;

after the terminal has matched the read first security code with the read second security code, activating the management control unit by means of the terminal for the management of the management control unit by the customer; and terminating the management mode.

2. The method as claimed in claim 1, wherein the multi-factor authentication check is performed in the management mode only after the terminal has matched the first and the second security codes.

3. The method as claimed in claim 1, wherein the transmission to the terminal of the storage medium ID, the first security code, or the second security code is performed offline in a wireless or wired manner.

4. The method as claimed in claim 1, wherein the first storage medium is a transponder which is delivered to the customer.

5. The method as claimed in claim 1, wherein the first security code is a binary code.

6. The method as claimed in claim 1, wherein the second security code is supplied as a digital signature of the first security code to the second storage medium and is stored there.

7. The method as claimed in claim 1, wherein the second security code is encrypted by means of a private key and in that the validity of the encrypted second security code is verified by the multi-factor authentication algorithm of the terminal by a public key.

8. The method as claimed in claim 7, wherein a hash value of the first security code is defined by means of a cryptographic hash function which is applied to the first security code, and in that the private key is applied to this hash value of the first security code in order to generate the second security code in the form of a digital signature of the first security code.

9. The method as claimed in claim 1, wherein, in the case of a mobile terminal of the customer which forms the second storage medium, an app of the provider activated by means of the second security code is installed on the mobile terminal in order to manage the management control unit.

10. A system for starting up and managing an offline access control device by means of a multi-factor and ID authentication, comprising:

the offline access control device which comprises a management control unit and a terminal activating the management control unit and having at least one data interface, wherein the multi-factor and ID authentication algorithm is implemented in the terminal and at least one authorization ID and one security code are storable in the terminal;

a mobile first storage medium in which a storage medium ID and a first security code are stored in a forgery-proof copy/clone and manipulation protection known only to the terminal manufacturer;

a mobile second storage medium in which a second security code generated using the first security code is stored;

wherein, in an initial start-up mode, the multi-factor and ID authentication algorithm for the initial start-up of the offline access control device is programmed, in wherein the mobile first storage media and the mobile second storage media are configured to be positioned by a customer at the location of the terminal, to read the storage medium ID and the first security code of the mobile first storage medium and the second security code of the mobile second storage medium by means of the at least one data interface, and to check offline whether the read first and second security codes match one another and, if so, to store the storage medium ID as the at least one authorization ID and the first security code in the terminal and to terminate the initial start-up mode; and wherein, in a management mode, the multi-factor and ID authentication algorithm for the management of the management control unit is programmed, where the mobile first storage media and the second mobile storage medium are configured to be positioned by a customer at the location of the terminal, to read the storage medium ID and the first security code of the mobile first storage medium and the second security code of the mobile second storage medium by means of the at least one data interface, and to check offline whether the read storage medium ID and the read first security code of the mobile first storage medium match the at least one authorization ID stored in the terminal and the first security code stored in the terminal and to check offline whether the read first security codes matches the read second security code, and, if so, to activate the management control unit for management by the customer, and to terminate the management mode.

11. The system as claimed in claim 10, wherein the multi-factor and ID authentication algorithm is programmed to perform the multi-factor authentication check in the management mode only after the terminal has matched the first and the second security codes.

12. The system as claimed in claim 10, wherein the multi-factor and ID authentication algorithm is programmed to activate the management control unit for the management of the management control unit by the customer in the initial start-up mode after the storage of the authorization ID.

13. The system as claimed in claim 10, wherein the first storage medium is a transponder and in that the terminal includes a data interface for the wireless reading of data stored in the transponder.

14. The system as claimed in claim 10, wherein the second storage medium is a mobile terminal of the customer and in that the terminal has a data interface for the wireless reading of data stored in the mobile terminal.

15. The system as claimed in claim 10, wherein the first storage medium has a copy/clone, write protection, read protection and manipulation protection.

16. The system as claimed in claim 10, wherein an app of the provider activated by means of the second security code is installed on a mobile terminal of the customer in order to manage the management control unit.

17. The method as claimed in claim 1, wherein offline checking, whether the read first and second security codes match one another, takes place in the terminal.

18. The method as claimed in claim 1, wherein the terminal alone validates the read first and second security codes which are generated exclusively by the terminal manufacturer.

19. The system as claimed in claim 10, wherein offline checking, whether the read first and second security codes match one another, takes place in the terminal.

20. The system as claimed in claim 10, wherein the terminal alone validates the read first and second security codes which are generated exclusively by the terminal manufacturer.

21. The system as claimed in claim 15, wherein the second storage medium includes a manipulation protection.

* * * * *